Feb. 7, 1939. C. SCHOLL 2,145,943
POWER TRANSMISSION MECHANISM
Filed Sept. 21, 1936 4 Sheets-Sheet 4
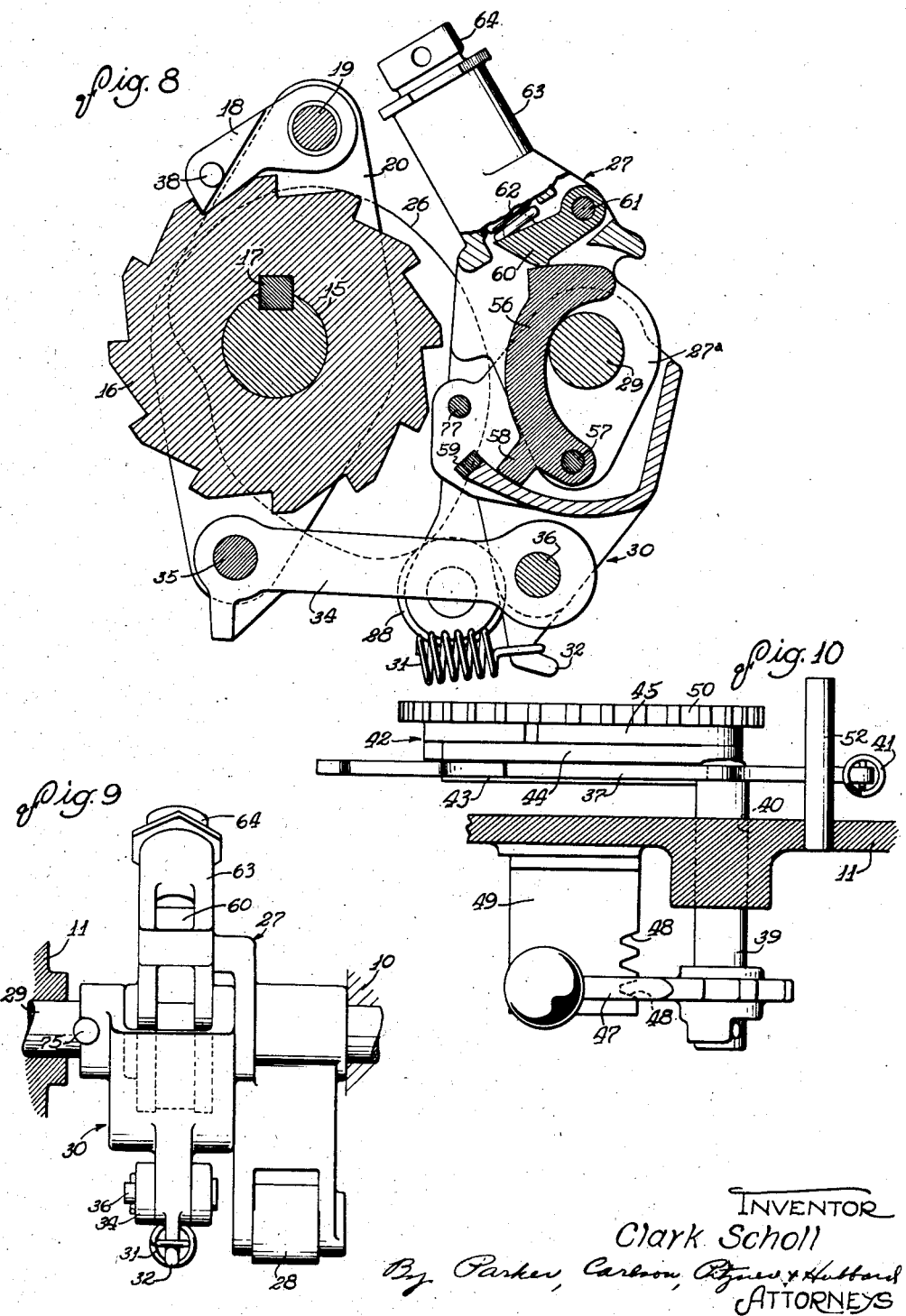
INVENTOR
Clark Scholl
By Parker, Carlson, Pitner & Hubbard
ATTORNEYS Patented Feb. 7, 1939

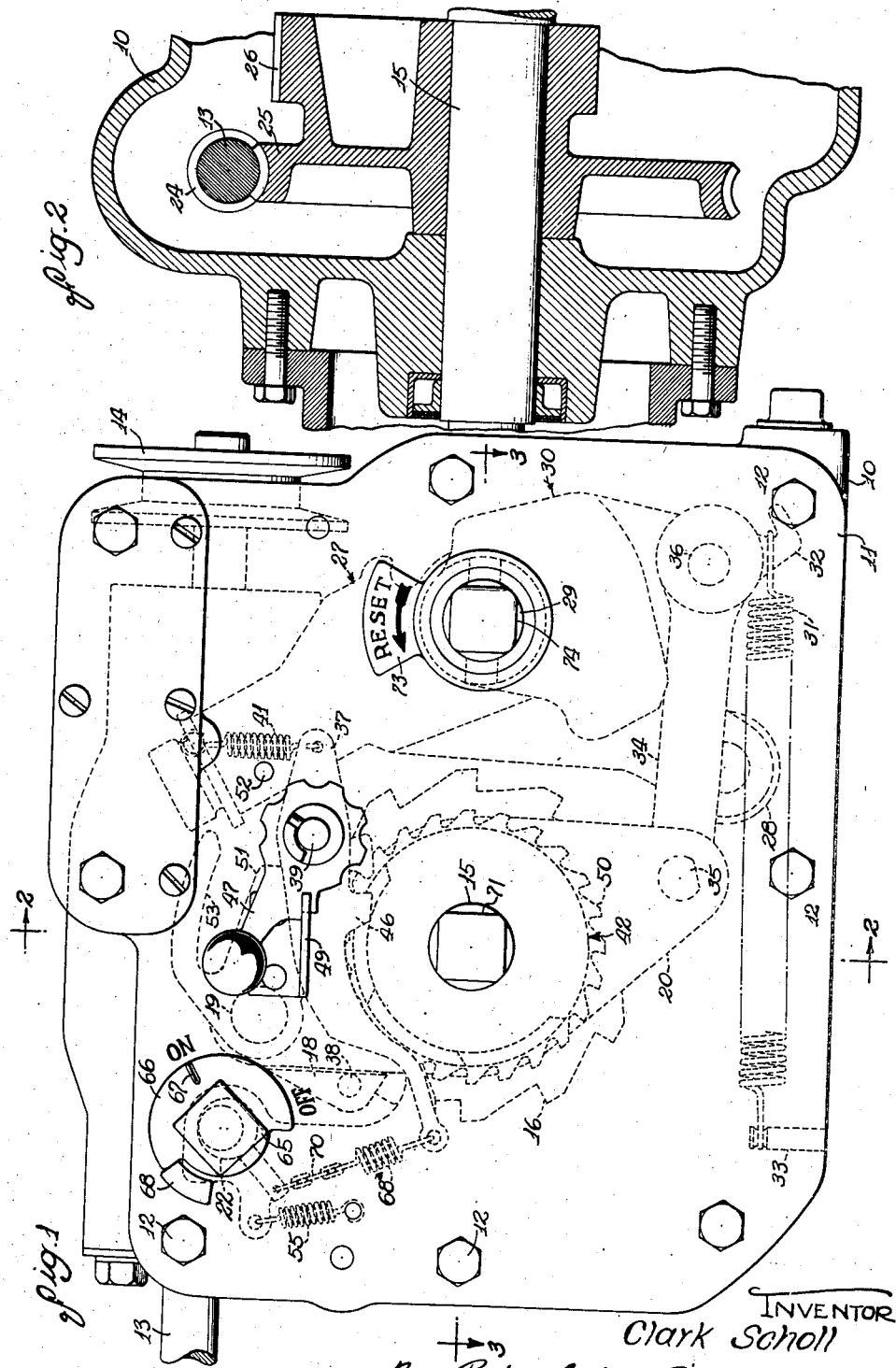

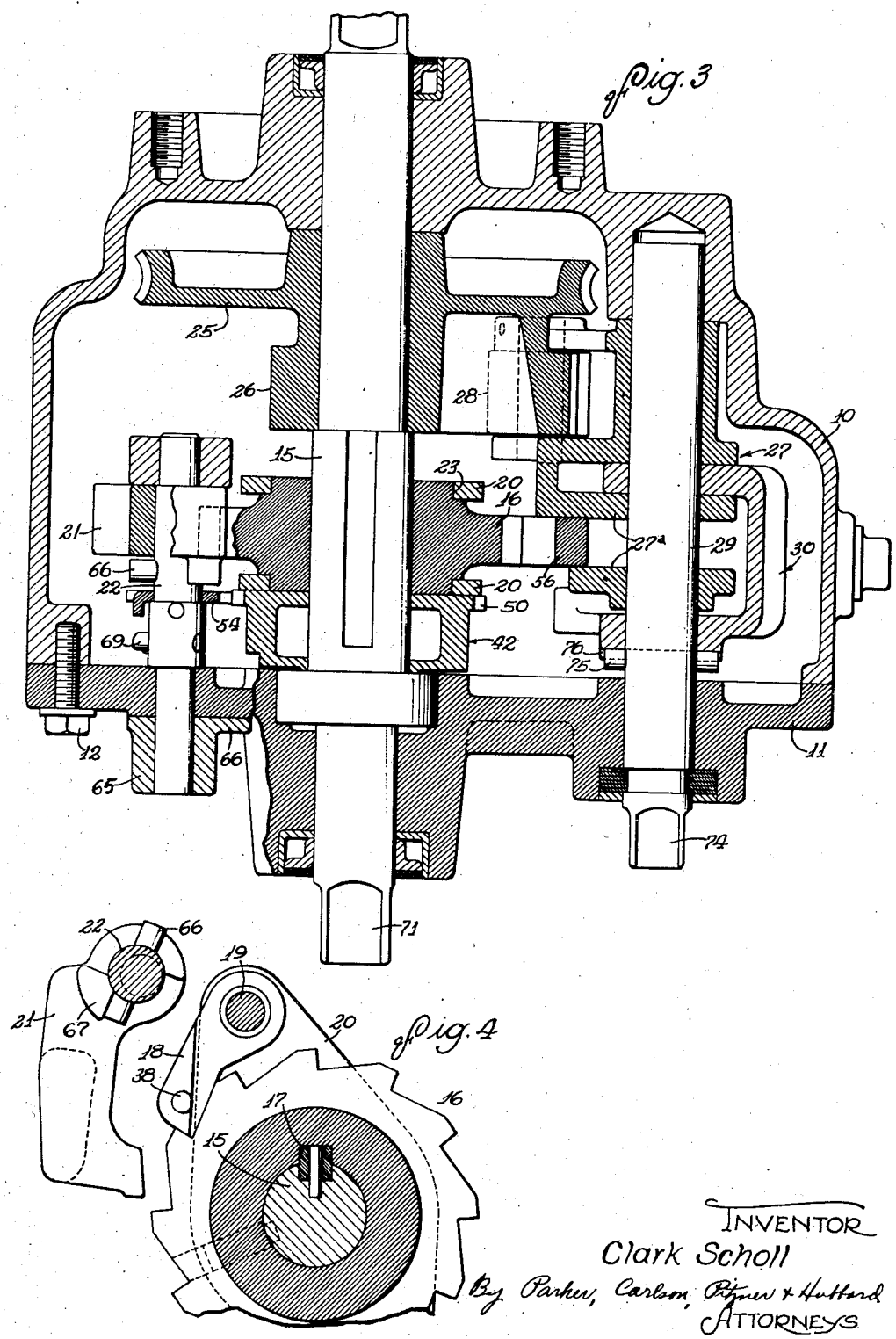

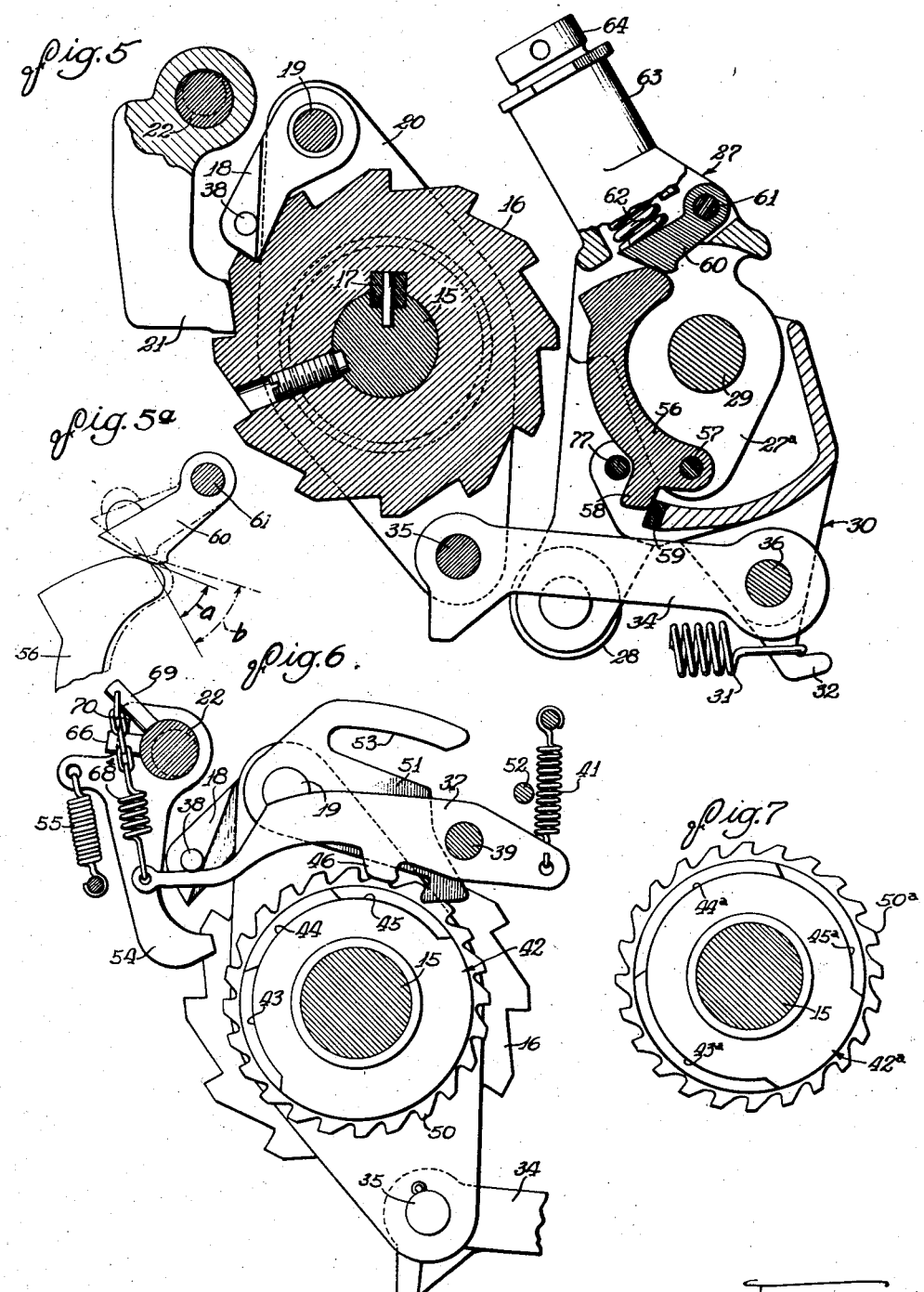

2,145,943

UNITED STATES PATENT OFFICE 2,145,943

POWER TRANSMISSION MECHANISM

Clark Scholl, Springfield, Ohio, assignor to The Steel Products Engineering Company, Springfield, Ohio, a corporation of Ohio Application September 21, 1936, Serial No. 101,758

11 Claims. (Cl. 74—125)

The invention relates to power transmission mechanisms and particularly to power transmission mechanisms which are adapted for use in driving the screw conveyer or other fuel feeding means of stokers.

It is an object of the invention to provide a rugged and compact power transmission mechanism which requires a minimum number of parts and is efficient in operation, for cyclically imparting a predetermined number of feeding impulses to the fuel feeding mechanism of a stoker or the like.

Another object of the invention is to provide a power transmission mechanism of the type described which may be readily and economically adapted for use with stokers requiring different selected rates of fuel feed by simply replacing a single element of the mechanism with a similar element which effects the desired change in operating characteristics.

Another object of the invention is to provide a power transmission mechanism of the character described having a simple and dependable clutch mechanism which may be economically manufactured and which is adapted to disconnect the driving and driven elements of the power transmission mechanism when the driven element is subjected to excessive load.

More specifically, it is an object of the invention to provide a power transmission mechanism of the character described having a clutch adapted to disconnect the driving and driven elements of the power transmission mechanism when the driven element is subjected to excessive load and including an arrangement for resetting the clutch instantly in its normal engaged position irrespective of the relative positions of the other elements of the transmission mechanism, the resetting operation being carried out by means of a simple operating arrangement readily manipulable by an unskilled operator.

Further objects and advantages of the invention will become apparent as the following description proceeds and the features of novelty which characterize the invention are pointed out with particularity in the claims annexed to and forming a part of this specification.

For a better understanding of the invention, reference may be had to the accompanying drawings in which Figure 1 is a front elevation of a power transmission mechanism embodying the invention.

Fig. 2 is a fragmentary transverse sectional view along the line 2—2 in Fig. 1, of a portion of the mechanism shown therein.

Fig. 3 is a horizontal sectional view along the line 3—3 in Fig. 1.

Fig. 4 is a fragmentary detail view partly in section of the main feeding ratchet wheel and its cooperating pawl, of the mechanism shown in Fig. 1.

Fig. 5 is a detail view of the ratchet and pawl mechanism shown in Fig. 4, as well as a portion of the actuating mechanism therefor and associated overload clutch release mechanism.

Fig. 5a is a diagrammatic representation of the movement of the cooperating latch and pawl of the overload clutch release mechanism.

Fig. 6 is a detail view of the adjustable control mechanism for regulating the number of feeding impulses in each cycle of operation.

Fig. 7 is a fragmentary detail view of a replaceable element which may be substituted in the mechanism shown in Fig. 6 in order to change the selected rates of feed for the entire feeding mechanism.

Fig. 8 is similar to Fig. 5 but particularly illustrates the overload clutch release mechanism in its disconnected position.

Fig. 9 is a side view of the overload clutch release mechanism shown in Fig. 8.

Fig. 10 is a fragmentary detail plan view of the feed control mechanism shown in Fig. 6, as well as the manual adjustment arrangement therefor.

In the exemplary form shown in the drawings, the invention is embodied in a power transmission mechanism for a stoker designed particularly for domestic use. The illustrative power transmission mechanism is mounted as a compact unitary structure within a casing 10 having a removable front cover 11 secured thereto by cap screws 12. Power is delivered to the power transmission mechanism by a driving element or drive shaft 13 extending therein and rotated by a suitable electric driving motor or the like connected by a V-belt (not shown) to a pulley 14. A driven element or driven shaft 15 also extends within the casing 10 and may be connected to a screw conveyer of a stoker or similar mechanism to be driven thereby.

The improved power transmission mechanism illustrated herein is adapted to impart a series of driving impulses to the driven shaft 15 from the driving shaft 13 in order that the fuel moved by the screw conveyer may be supplied to the combustion chamber of a suitable furnace (not shown) in small successive increments. The driving impulses are imparted to the driven shaft 15 by a ratchet mechanism, which includes a main feeding ratchet 16 rigidly secured to the driven shaft 15 by a key 17. The ratchet wheel 16 is actuated in a counterclockwise direction, as viewed in Figs. 1 and 4, by a cooperating feeding pawl 18, which is pivotally supported by a pin 19 between the upper ends of a pair of oscillatable radius plates 20. A holding pawl 21 pivotally secured to an eccentrically mounted shaft 22 engages the ratchet wheel 16 in order to prevent clockwise movement thereof, as viewed in Fig. 4.

The radius plates 20 are loosely mounted on laterally extending hubs 23 (see Fig. 3) formed on the ratchet wheel 16 and are thus adapted to oscillate about an axis coincident with the axis of the ratchet wheel 16 and driven shaft 15.

Oscillating movement is imparted to the radius plates 20 from the rotatable driving shaft 13 through a driving connection, which includes a worm 24 on the shaft 13 meshing with a worm wheel 25 loosely journaled on the driven shaft 15 (see Fig. 2). A peripheral cam 26 is rigidly secured to the side of the worm wheel 25 and rotatable therewith. A cam follower member 27 is provided with a roller 28 contacting with the periphery of the cam 26 so that the member 27 is oscillated on its supporting shaft 29 by the rotation of the cam. The member 27 is connected to a member 30, also rockably mounted on the shaft 29, through an improved overload clutch release mechanism which is hereinafter described in greater detail. At this point in the description it is believed to be sufficient to say that the clutch release mechanism ordinarily maintains the members 27 and 30 against relative movement with respect to each other so that they oscillate on the shaft 29 as a unitary structure. A tension spring 31, secured at its opposite ends to a lug 32 on the bottom of the member 30 and to a pin 33 mounted in the bottom of the casing 10, tends to rotate the members 27 and 30 in a clockwise direction as viewed in Fig. 1, thus maintaining the cam follower roller 28 in contact with the peripheral surface of the cam 26. The radius plates 20 are connected to the lower portion of the member 30 by a link 34 pivotally connected to these parts by pins 35 and 36.

It will thus be seen that upon rotation of the driving shaft 13 the cam 26 is rotated by the worm wheel 25 and its cooperating worm 24. The cam follower roller 28, following the contoured periphery of the cam 26, causes the members 27 and 30 to be oscillated on the shaft 29 so that the radius plates 20 are in turn oscillated about the shaft 15 by the link 34. This oscillation of the radius plates 20 causes the feeding pawl 18 to engage successive teeth of the ratchet wheel 16 and thus imparts a step-by-step rotative movement to the driven shaft 15. The arrangement described in which the cam 26, as well as the ratchet wheel 16 and the support for its cooperating pawl, are all mounted on a single shaft, preferably the driven shaft of the mechanism, is particularly advantageous because of the compactness of the resulting structure and its general simplicity of construction.

An arrangement has been provided for selectively varying the number of driving impulses imparted to the driven shaft 15 in a unit of time or cycle of operation so that the total quantity of fuel supplied by a stoker screw conveyer, for example, connected to the driven shaft 15 may be selectively varied. This arrangement preferably includes a pawl interference arm or detent 37 (Figs. 1 and 6) engageable with a pin 38 carried by the feeding pawl 18 to lift the pawl out of operative engagement with the ratchet wheel 16. The detent 37 is pivotally mounted on a small shaft 39 rotatably mounted in a bore 40 (Fig. 10) formed in the casing 10. A tension spring 41 secured to the rear end of the detent 37 normally biases the same to a position out of engagement with the pin 38 on feed pawl 18.

The detent 37 is, in turn, moved into engagement with the pin 38 on pawl 18 against the bias of tension spring 41 by an interrupting arrangement including a generally cylindrical cam 42 having three parallel peripheral cam tracks therein including segmental-shaped relieved portions 43, 44 and 45 (Fig. 6). The cam 42 is loosely journaled on the driven shaft 15 between the main feed ratchet wheel 16 and the casing cover 11. A depending foot 46 formed on the detent 37 normally rides on the surface of one of the three cam tracks formed on the cam 42. The length of the foot 46 is so determined that when it is in engagement with one of the relieved portions 43, 44 or 45, the detent 37 will be permitted to move downwardly out of engagement with the pin 38 on pawl 18, thus allowing the pawl to engage the teeth of ratchet wheel 16. When the foot 46 rides up on the unrelieved portions of the cam 42, however, the detent 37 is moved upwardly so that it engages the pin 38 and moves the pawl 18 out of operative engagement with the ratchet wheel.

A manual feed adjustment handle 47 (Fig. 10) is secured to the outer end of the shaft 39 so that the shaft may be moved axially through the hole 40 to position detent 37 in engagement with any one of three cam tracks formed on the cam 42. The handle 47 may be moved into engagement with any one of the notches 48 in an index plate 49 secured to the casing cover 11 so as to position the detent 37 in engagement with the selected cam track. Since the relieved portions 43, 44 and 45 of the cam 42 are of varying length it will be seen that the detent 37 will maintain the feed pawl 18 out of operative engagement with the ratchet wheel 16 during varying portions of each complete revolution of the cam 42.

An arrangement has been provided for substantially continuously rotating the cam 42 so that a selected number of feeding impulses may be imparted to the driven shaft 15 by the main feed pawl 18 under the control of the detent 37 during each cycle of operation defined by a complete rotation of the cam 42. This arrangement preferably includes a ratchet wheel 50 cast as an integral part of the cam 42 and having a relatively large number of teeth as compared to the main feeding ratchet wheel 16. The ratchet wheel 50 is rotated by a feed control pawl 51 pivotally mounted on the upper ends of the radius plates 20 by the pin 19 which also serves to pivotally support the main feed pawl 18. A pin 52 rigidly mounted on the casing cover 11 is positioned in the path of movement of the feed control pawl 51 and bears against an upper edge 53 of an arcuate slot formed in the pawl, thus maintaining the pawl out of engagement with the ratchet wheel 50 except during the latter part of the rocking movement of the radius plates 20. The pawl 51 is thus caused to engage successive teeth on the ratchet wheel 50 despite the fact that the radius plates move a sufficient distance that the pawl 51 passes over several teeth on the ratchet wheel 50 during each actuation of the radius plates. A back-up pawl 54 loosely journaled on the shaft 22 is biased into engagement with the ratchet wheel 50 by a tension spring 55 and serves to prevent overrunning of the ratchet wheel. Substantially constant rotative movement is thus imparted to the cam 42 by the cooperating pawl 51 and ratchet wheel 50 so that the cyclic control of the main feed pawl 18 described above may be effected by the cooperating cam 42 and detent 37.

The cam 42 and ratchet wheel 50 are preferably made as a unitary structure so that they may be replaced by a similar unit having cam tracks of different lengths. By thus substituting another feed control unit with such altered characteristics, it is possible to change the selective feed rates for the entire driving mechanism. Thus, by the substitution of a somewhat different part for this one element the power transmission mechanism may be adapted for use in different sized stokers requiring different rates of feed. Since by far the greater number of parts of the power transmission mechanism would in such case be identical, it will be seen that the cost of manufacture of power transmission mechanisms adapted for use with different sized stokers may be greatly reduced. A modified feed control unit is illustrated in Fig. 7 which may be substituted for that shown in Fig. 6. This substitute feed control unit includes a cylindrical cam 42ᵃ identical in construction with the cam 42 except that the relieved surfaces 43ᵃ, 44ᵃ, and 45ᵃ are of greater length than the corresponding relieved surfaces 43, 44 and 45 on the cam 42. A ratchet wheel 50ᵃ is cast integrally with the cam 42ᵃ and is adapted to cooperate with the pawl 51 to rotate the cam. The ratchet wheel 50ᵃ is identical in construction with the ratchet wheel 50 so that the pawl 51 will serve to actuate the same without alteration or change. Since the feed control unit is loosely mounted on the shaft 15 next to the removable casing cover 11, it may be replaced by another unit upon removal of the cover and with a minimum amount of manipulation of the other parts of the apparatus.

It has heretofore been proposed to connect certain parts of stoker drive mechanisms by frangible pins so that the connection between the driving motor and fuel conveyer will be broken upon breakage of the pin when an overload is imposed thereon due to an obstruction in the conveyer or for any other reason. Such an arrangement has the disadvantage, however, that the parts of the broken pin must be dislodged and a new pin put in to replace it. This operation may be difficult for an unskilled operator to perform, especially if the pin is not located in a readily accessible part of the mechanism. Also, a replacement pin of the proper frangibility is frequently not available so a nail or any other substitute which comes to hand is used and consequently, the driving mechanism and its prime mover are subjected to the liability of dangerous overloads. The improved clutch release mechanism included in the present apparatus obviates these difficulties in that it may be readily reset after the obstruction has been cleared. The clutch mechanism per se is described and claimed in my copending application Serial No. 207,202, filed May 11, 1938, and which is a division of the present application.

In the particular construction illustrated, the overload clutch release mechanism is interposed between the cam follower member 27 and the member 30, both of which members are rockably mounted on the shaft 29. As best shown in Fig. 3, the member 30 is U-shaped in cross section as is the cam follower member 27. A bifurcated leg 27ᵃ of the member 27 extends within the legs of the member 30, the bifurcated leg 27ᵃ being journaled on the shaft 29.

The clutch release mechanism preferably includes an arcuate-shaped clutch pawl 56 pivotally supported between the legs 27ᵃ by a pin 57 (Fig. 5). A projection 58 on the clutch pawl 56 is positioned to engage a hardened steel insert 59 cast in the member 30. The clutch pawl 56 is normally maintained with the projection 58 in contact with the insert 59 by a latch 60 which is pivotally connected to the member 27 by a pin 61. A compression spring 62 mounted within a tubular extension 63 formed on the upper side of the member 27 serves to releasably maintain the latch 60 in contact with the clutch pawl 56. A suitable adjusting nut 64 is threaded in the upper end of the extension 63 and contacts the upper end of the compression spring 62 so that the compressive force exerted by the latter may be selectively varied. It will thus be seen that the compression spring 62 normally maintains the latch 60 in engagement with the clutch pawl 56 so that the member 30 is rotated in a counter-clockwise direction, as viewed in Fig. 5, upon a similar movement of the cam follower member 27. The tension spring 31 hereinbefore described serves to maintain the insert 59 pressed tightly against the projection 58 so that the members 30 and 27 are in alinement during clockwise oscillation thereof.

If an overload is imposed on the driving mechanism due to an obstruction in the fuel conveyer or for any other reason, the latch spring 62 will be compressed and the upper end of the clutch pawl 56 will move past the latch 60 thus disengaging the projection 58 and insert 59 and breaking the operative connection between the members 27 and 30. The disengaged position of the overload clutch release mechanism is illustrated in Fig. 8. When in the disengaged position, further rotation of the cam 26 by the driving shaft 13 will not effect any movement of the feed pawl 18 and cooperating ratchet wheel 16 so that the driving mechanism is rendered entirely inoperative. The compression in the spring 62 may be adjusted by the nut 64 so as to selectively vary the load at which the overload clutch release mechanism will trip.

In order to avoid sticking of the release mechanism due to the increased force exerted by the spring 62 as the latch 60 rides upwardly on the pawl 56, the cooperating end surfaces of the pawl and latch are preferably made arcuate in shape, the arcs being tangential and that on the latch of slightly greater radius than that of the pawl. The pawl and latch move under overload from their normal positions shown in full lines in Fig. 5ᵃ until they occupy the dot-dash line positions indicated, at the instant of breaking apart. In such case the pressure angle therebetween increases from "a" to "b" and to some extent compensates for the increasing spring pressure. As a result, the release mechanism trips at the selected overload value without substantial variation.

An arrangement has been provided for manually resetting the overload clutch release mechanism from the exterior of the casing 10. As a preliminary to this resetting operation the main feed pawl 18 and back-up pawl 21 are disengaged from the ratchet wheel 16 so that the radius plates 20 may be oscillated about the driven shaft 15 in order to bring the member 30 into alinement with the cam follower member 27. In this preliminary operation, the shaft 22 is rotated in a clockwise direction, as viewed in Figs. 1 and 6, from its "on" to its "off" position. The outer end 65 of the shaft 22 is preferably squared so that a suitable wrench may be attached thereto to thus turn the shaft. An arcuate indicating plate 66 is secured to the outer portion of the shaft and an indexing mark 67 thereon indicates when the shaft is in its "on" and "off" positions. A lug 68 on the face of the cover plate 11 is positioned to abut against the shouldered ends of a peripheral notch formed in the plate 66 so as to limit the turning of the shaft 22 to the proper amount. When the shaft 22 is rotated in a clockwise direction from the position shown in Fig. 5 to that shown in Fig. 6, its eccentric mounting causes it to lift the feed control back-up pawl 54 out of engagement with the ratch wheel 50. Also, during approximately three-quarters of this rotative movement of the shaft 22, the main back-up pawl 21 is raised sufficiently that the load against it is totally or partially relieved. During the last part of the rotative movement of the shaft 22, a pin 66 in the shaft 22 engages a shoulder 67 (Fig. 4) on the hub of the pawl 21, thus turning the pawl completely out of engagement with the teeth of the ratchet wheel 26.

The detent 37 is also connected to the shaft 22 so that it may be utilized to lift the main feed pawl 18 out of engagement with the ratchet wheel 26 when the shaft 22 is turned from its "on" to its "off" position. This connection includes a tension spring 68a secured to the outer end of the detent 37, the other end of the spring being connected to a pin 69 on the shaft 22 by a short chain 70 (Fig. 6). As the shaft 22 is turned in a clockwise direction, the outer end of the detent 37 will thus be lifted so that it engages the pin 38 on the main feed pawl 18, lifting the same out of engagement with the ratchet wheel 26. The spring 68a is interposed between the shaft 22 and the detent 37 so that if the main feed pawl 18 is contacting a tooth of the ratchet wheel under load, the detent 37 will not raise the main feed pawl until the load has been relieved by turning the driven shaft 15 a short distance. This spring arrangement is desirable because of the light construction of the detent 37. The outer end of the driven shaft 15 is squared as indicated at 71, so that it may be readily turned by a suitable wrench.

After this preliminary disengagement of the pawl and ratchet mechanism, the overload clutch release mechanism is reset by turning the shaft 29 in a counterclockwise direction as viewed in Fig 1. An escutcheon plate 73 having an arrow indicating the proper direction of turning for resetting the clutch is preferably secured to the front of the casing. The outer end portion 74 of the shaft 29 is also squared so that it may be readily engaged by a suitable wrench. As the shaft 29 is thus rotated in a counterclockwise direction, a pin 75 which extends therethrough (Fig. 3) engages a shoulder 76 formed on the hub of the member 30 and thus causes the member 30 to move in a counterclockwise direction about the shaft 29 and into alinement with the cam follower member 27. By the time that the member 30 has been rotated sufficiently so that the contacting surface of the projection 58 on the clutch pawl 56 can be brought into working position against the steel insert 59, a pin 77 (Fig. 5) rigidly mounted on the member 30 engages the rear side of the projection 58 and turns the clutch pawl 56 thus compressing the latch spring 62 until the upper end of the clutch pawl snaps into place at the forward end of the spring pressed latch 60. It will thus be seen that the overload release mechanism may be readily reset by a simple manipulation of the aparatus. Moreover, the resetting operation is substantially instantaneous in that a latch need not be held in operative position until certain other parts of the apparatus have rotated into proper position after starting of the prime mover.

After the overload clutch release mechanism has been reset as described above, the shaft 22 is rotated from its "off" to its "on" position, so that the pawls 18, 21 and 54 are again brought into engagement with their respective ratchet wheels. The mechanism is then completely conditioned for further normal operation.

I claim as my invention:

1. A transmission mechanism comprising, in combination, a driving shaft, a driven shaft, a ratchet wheel rigidly connected to said driven shaft, a pawl engageable with said ratchet wheel, an oscillatable support for said pawl loosely journaled on said driven shaft, means including a cam operatively connected to said driving shaft and loosely journaled on said driven shaft for oscillating said support, interrupting means including a detent engageable with said pawl for moving said pawl out of operative engagement with said ratchet wheel, means including a plurality of selectively available cams loosely journaled on said driven shaft for conditioning said interrupting means to periodically maintain said detent in a predetermined position with respect to said pawl for predetermined sequential intervals of time, and means including said driving shaft for substantially continuously rotating said last named cams.

2. A transmission mechanism comprising, in combination, a driving shaft, a driven shaft, a ratchet wheel rigidly connected to said driven shaft, a pawl engageable with said ratchet wheel, an oscillatable support for said pawl loosely journaled on said driven shaft, means including a cam operatively connected to said driving shaft and loosely journaled on said driven shaft for oscillating said support, interrupting means including a detent engageable with said pawl for moving said pawl out of operative engagement with said ratchet wheel, means including a plurality of peripheral cams loosely journaled on said driven shaft for conditioning said interrupting means to periodically maintain said detent in a predetermined position with respect to said pawl for predetermined sequential intervals of time, a second ratchet wheel loosely journaled on said driven shaft and rigid with said last named cams, and a second pawl actuated by said driving shaft and engageable with said second ratchet wheel to actuate the same.

3. A transmission mechanism comprising, in combination, an enclosing casing provided with a removable cover, a driving shaft and a driven shaft extending into said casing, a ratchet wheel within said casing rigidly connected to said driven shaft, a pawl engageable with said ratchet wheel, an oscillatable support for said pawl loosely journaled on said driven shaft, means including a cam operatively connected to said driven shaft and loosely journaled on said driven shaft for oscillating said support, interrupting means including a detent engageable with said pawl for moving said pawl out of operative engagement with said ratchet wheel, a replaceable cam unit having a plurality of cam tracks thereon of different configuration loosely journaled on said driven shaft within said casing adjacent said removable cover, means for rendering selected ones of said cam tracks operative to condition said interrupting means to periodically maintain said detent in a predetermined position with respect to said pawl for predetermined sequential intervals of time, and means including said driving shaft for substantially continuously rotating said cam unit.

4. A transmission mechanism comprising, in combination, an enclosing casing provided with a removable cover, a driving element and a driven element extending within said casing, a ratchet wheel having a driving connection with said driven element, a pawl engageable with said ratchet wheel, means including said driving element for actuating said pawl to move said ratchet wheel, interrupting means including a detent engageable with said pawl for moving said pawl out of operative engagement with said ratchet wheel, a replaceable cam unit having a plurality of cam tracks thereon of different configuration, means for detachably and rotatably supporting said replaceable cam unit adjacent said casing cover, and means for rendering selected ones of said cam tracks operative to condition said interrupting means to periodically maintain said detent in a predetermined position with respect to said pawl for predetermined sequential intervals of time.

5. A transmission mechanism comprising, in combination, an enclosing casing provided with a removable cover, a driving element and a driven element extending within said casing, a ratchet wheel having a driving connection with said driven element, a pawl engageable with said ratchet wheel, means including said driving element for actuating said pawl to move said ratchet wheel, interrupting means including a detent engageable with said pawl for moving said pawl out of operative engagement with said ratchet wheel, a substantially cylindrical replaceable cam unit having a plurality of peripheral cam tracks thereon of different configuration, means for detachably and rotatably supporting said replaceable cam unit adjacent said casing cover, means for rendering selected ones of said cam tracks operative to condition said interrupting means to periodically maintain said detent in a predetermined position with respect to said pawl for predetermined sequential intervals of time, a second ratchet wheel rigid with said cam unit, and means including said driving element for imparting substantially continuous rotative movement to said second ratchet wheel.

6. A transmission mechanism comprising, in combination, a driving element, a driven element, a ratchet wheel having a driving connection with said driven element, a pawl engageable with said ratchet wheel, an oscillatable member driven by said driving element, a second oscillatable member operatively connected to said pawl, means including a spring biased latch releasable upon a predetermined overload for connecting said oscillatable members in operative relation, manually operable means for resetting said spring biased latch, and means for moving said pawl out of engagement with said ratchet wheel during the resetting of said latch.

7. A transmission mechanism comprising, in combination, a driving element, a driven element, a ratchet wheel having a driving connection with said driven element, a pawl engageable with said ratchet wheel, interrupting means including a detent engageable with said pawl for moving said pawl out of operative engagement with said ratchet wheel, means for periodically moving said detent into and out of operative engagement with said pawl, means including a spring biased latch releasable upon a predetermined overload for connecting said driving element and said pawl in operative relation, manually operable means for resetting said spring biased latch, and manually operable means utilizing said detent to move said pawl out of engagement with said ratchet wheel during the resetting of said latch.

8. A transmission mechanism comprising, in combination, a driving element, a driven element, a ratchet wheel having a driving connection with said driven element, a pawl engageable with said ratchet wheel, a member driven by said driving element, a shaft for oscillatably supporting said last named member, a second oscillatable member mounted on said shaft and operatively connected to said pawl, said second oscillatable member having a hub provided with a recess therein, means including a spring biased latch releasable upon predetermined overload for connecting said oscillatable members in operative relation, and manually operable means including a projection on said shaft normally out of contact with said hub and movable into said recess therein for resetting said spring biased latch.

9. A transmission mechanism comprising, in combination, a driving element, a driven element, a ratchet wheel having a driving connection with said driven element, a pawl engageable with said ratchet wheel, a member driven by said driving element, a shaft for oscillatably supporting said last named member, a second oscillatable member mounted on said shaft and operatively connected to said pawl, a latch pivotally mounted on one of said oscillatable members, means including a compression spring bearing against said latch for releasably maintaining the same operatively connected with the other of said oscillatable members, said latch being movable out of engagement therewith against the pressure of said spring upon the application of a predetermined overload on said oscillatable members, manually operable means for adjusting the pressure of said spring to vary the overload at which said latch is released.

10. A transmission mechanism comprising, in combination, an enclosing casing, a driving shaft and a driven shaft extending within said casing, a ratchet wheel having a driving connection with said driven shaft, a pawl engageable with said ratchet wheel, means including an overload clutch release mechanism for connecting said driving shaft in driving relation with said pawl, means including a manual operating member disposed exteriorly of said casing for resetting said release mechanism to operative condition after an overload has caused the same to release, and means including a second manual operating member located exteriorly of said casing for moving said pawl out of operative engagement with said ratchet wheel during the resetting of said overload release mechanism.

11. A transmission mechanism comprising, in combination, a driving cam, a driven element, a ratchet wheel having a driving connection with said driven element, a pawl engageable with said ratchet wheel, a first oscillatable member having a cam follower thereon bearing against said driving cam, a second oscillatable member operatively connected to said pawl, means including a spring biased latch releasable upon a predetermined overload for connecting said oscillating members in operative relation, and means applying a biasing force to said second oscillatable member for urging said follower into engagement with said cam and for alternatively retaining said second oscillatable member out of operative relation with said latch upon the release thereof.

CLARK SCHOLL.